United States Patent [19]
Lett et al.

[11] Patent Number: 5,657,414
[45] Date of Patent: Aug. 12, 1997

[54] AUXILIARY DEVICE CONTROL FOR A SUBSCRIBER TERMINAL

[75] Inventors: David B. Lett; Scott L. Hamilton, both of Duluth; Kinney C. Bacon, Lawrenceville; Michael Raley, Lilburn, all of Ga.

[73] Assignee: Scientific-Atlanta, Inc., Norcross, Ga.

[21] Appl. No.: 984,023

[22] Filed: Dec. 1, 1992

[51] Int. Cl.⁶ .................................................. H04N 7/16
[52] U.S. Cl. .............................. 386/35; 386/83; 348/734; 348/460; 348/906
[58] Field of Search ..................... 348/10, 6, 7, 734; 455/6.1, 6.3, 4.1, 4.2, 3.1, 53.1, 151.1, 151.2, 151.4; 358/335; 386/35, 83; H04N 7/16

[56] References Cited

U.S. PATENT DOCUMENTS

| | | |
|---|---|---|
| 4,450,477 | 5/1984 | Lovett . |
| 4,567,512 | 1/1986 | Abraham . |
| 4,633,462 | 12/1986 | Stifle et al. . |
| 4,706,121 | 11/1987 | Young . |
| 4,755,883 | 7/1988 | Uehira ........................ 348/734 |
| 4,855,730 | 8/1989 | Venners et al. ............. 348/734 |
| 4,908,707 | 3/1990 | Kinghorn . |
| 4,977,455 | 12/1990 | Young . |
| 5,065,235 | 11/1991 | Iijima ........................ 455/6.1 |
| 5,123,046 | 6/1992 | Levine ........................ 380/10 |
| 5,151,789 | 9/1992 | Young . |
| 5,247,364 | 9/1993 | Banker et al. . |
| 5,293,357 | 3/1994 | Hallenbeck ............... 348/734 |
| 5,307,173 | 4/1994 | Yuen et al. ................. 358/335 |
| 5,353,121 | 10/1994 | Young et al. . |
| 5,365,282 | 11/1994 | Levine ........................ 348/734 |
| 5,410,326 | 4/1995 | Goldstein ................... 348/7 |
| 5,479,266 | 12/1995 | Young et al. . |
| 5,479,268 | 12/1995 | Young et al. . |

FOREIGN PATENT DOCUMENTS

| | | | |
|---|---|---|---|
| 0508394 | 10/1992 | European Pat. Off. | H04N 7/16 |
| 3234199 | 10/1991 | Japan | 455/53.1 |
| 2126002 | 3/1984 | United Kingdom . | |
| 0015083 | 10/1991 | WIPO . | |

OTHER PUBLICATIONS

Form PCT/IPEA/408 for International Application No. PCT/US93/11649.

Form PCT/ISA/210 (second sheet) (Jul. 1992) for PCT/US93/11649.

Model 8580 Addressable Set–Top Terminal; pp. 6–9 to 6–12; Broadband Communications Products Catalog, Scientific Atlanta, Oct. 1986.

*Primary Examiner*—David E. Harvey
*Attorney, Agent, or Firm*—Banner & Witcoff, Ltd.

[57] ABSTRACT

An auxiliary device control for a subscriber terminal includes a four wire ribbon cable defining a bidirectional communication and data interface from the terminal to one or more auxiliary devices. A communication and data protocol for the bidirectional transfer of instructions, status, and data over the interface includes an address field, command or reply field, data length field, and checksum field transmitted at 9600 baud. In a preferred implementation, the auxiliary device to be controlled is an IR peripheral controller which can tune a VCR, and switch it on and off. Several transactions in the communications and data protocol are used to effect the operation where a control VCR command and reply transaction cause the control of the tuning and recording of the VCR. A set-up VCR command and a brand reply transaction is used to provide information to configure the controller with brands and model of the VCRs. A program event code command and a program event timer reply transaction provide for the automatic recording of a program event based on an event code listed in a television schedule. A channel map command and a reply transaction provide for the downloading of the local cable system channel line up into the controller.

8 Claims, 14 Drawing Sheets

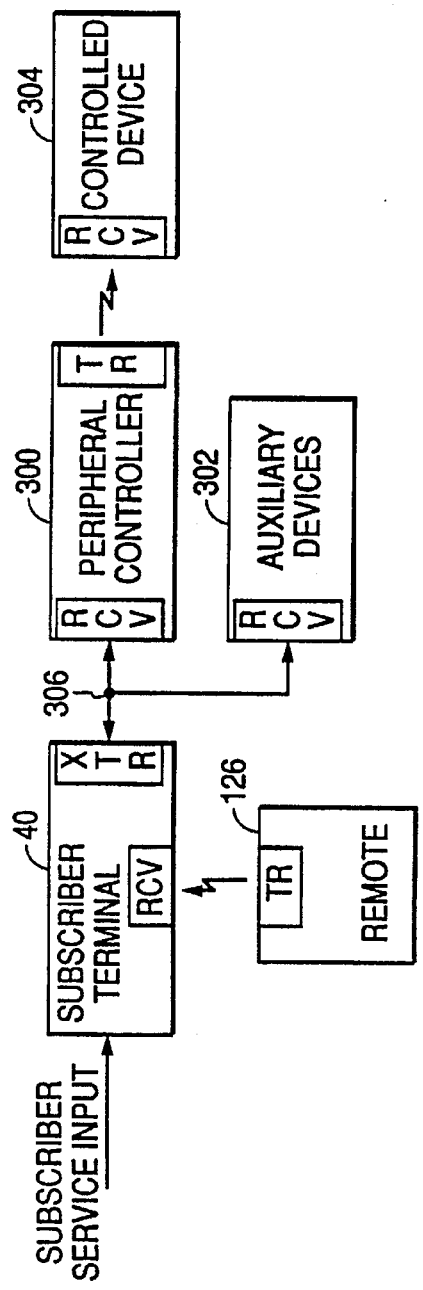
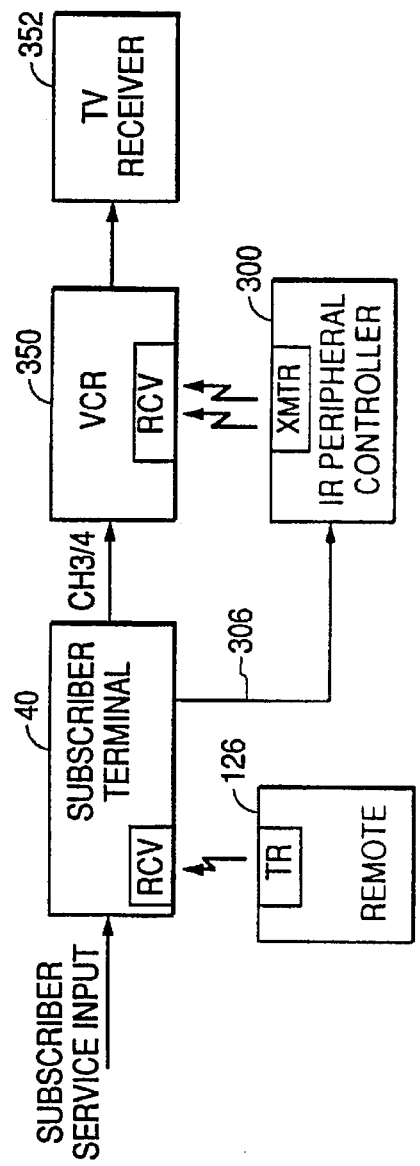

FIG. 12

PROGRAM EVENT CODE

| PER CON | PEC | DATA LENGTH 12 | ... | CHECKSUM |
|---|---|---|---|---|

| | | | | | | | | |
|---|---|---|---|---|---|---|---|---|
| 1 | PEC DIGIT 8 | | | | PEC DIGIT 7 | | | |
| 2 | PEC DIGIT 6 | | | | PEC DIGIT 5 | | | |
| 3 | PEC DIGIT 4 | | | | PEC DIGIT 3 | | | |
| 4 | PEC DIGIT 2 | | | | PEC DIGIT 1 | | | |
| 5 | PEC DIGIT 0 | | | | # PEC DIGITS | | | |
| 6 | 0 | 0 | 0 | TIME (HOURS) ACT | | | | |
| 7 | 0 | 0 | TIME (MINUTES) ACT | | | | | |
| 8 | 0 | 0 | TIME (SECONDS) ACT | | | | | |
| 9 | 0 | 0 | 0 | 0 | DATE (MONTH) ACT | | | |
| 10 | 0 | 0 | 0 | DATE (DAY) ACT | | | | |
| 11 | DATE (YEAR) ACT | | | | | | | |
| 12 | 0 | 0 | 0 | 0 | 0 | 0 | 0 | 0 |

FIG. 13

PROGRAM EVENT TIMER

| SUB-TERM | PET | DATA LENGTH 8 | ... | CHECKSUM |
|---|---|---|---|---|

| | | | | |
|---|---|---|---|---|
| 1 | 0 | BAT LOW | BAD | TIME (HOURS) |
| 2 | 0 | 0 | | TIME (MINUTES) |
| 3 | 0 | 0 | 0 | 0 | EVENT DATE (MONTH) |
| 4 | 0 | 0 | 0 | EVENT DATE (DAY) |
| 5 | EVENT DATE (YEAR) | | | |
| 6 | EVENT LENGTH (HOURS) | | | |
| 7 | EVENT LENGTH (MINUTES) | | | |
| 8 | EVENT CHANNEL (SOURCE) | | | |

| | SLOTS | |
|---|---|---|
| HOME BOX OFFICE | | 1 |
| ESPN | | 2 |
| AMER. MOVIE CLAS | | 3 |
| ⋮ | ⋮ | ⋮ |
| TBS | | 234 |
| USA NETWORK | | 235 |
| CINEMAX | | 236 |
| MTV | | 237 |
| TNT | | 238 |
| CBS | | 239 |
| NBC | | 240 |

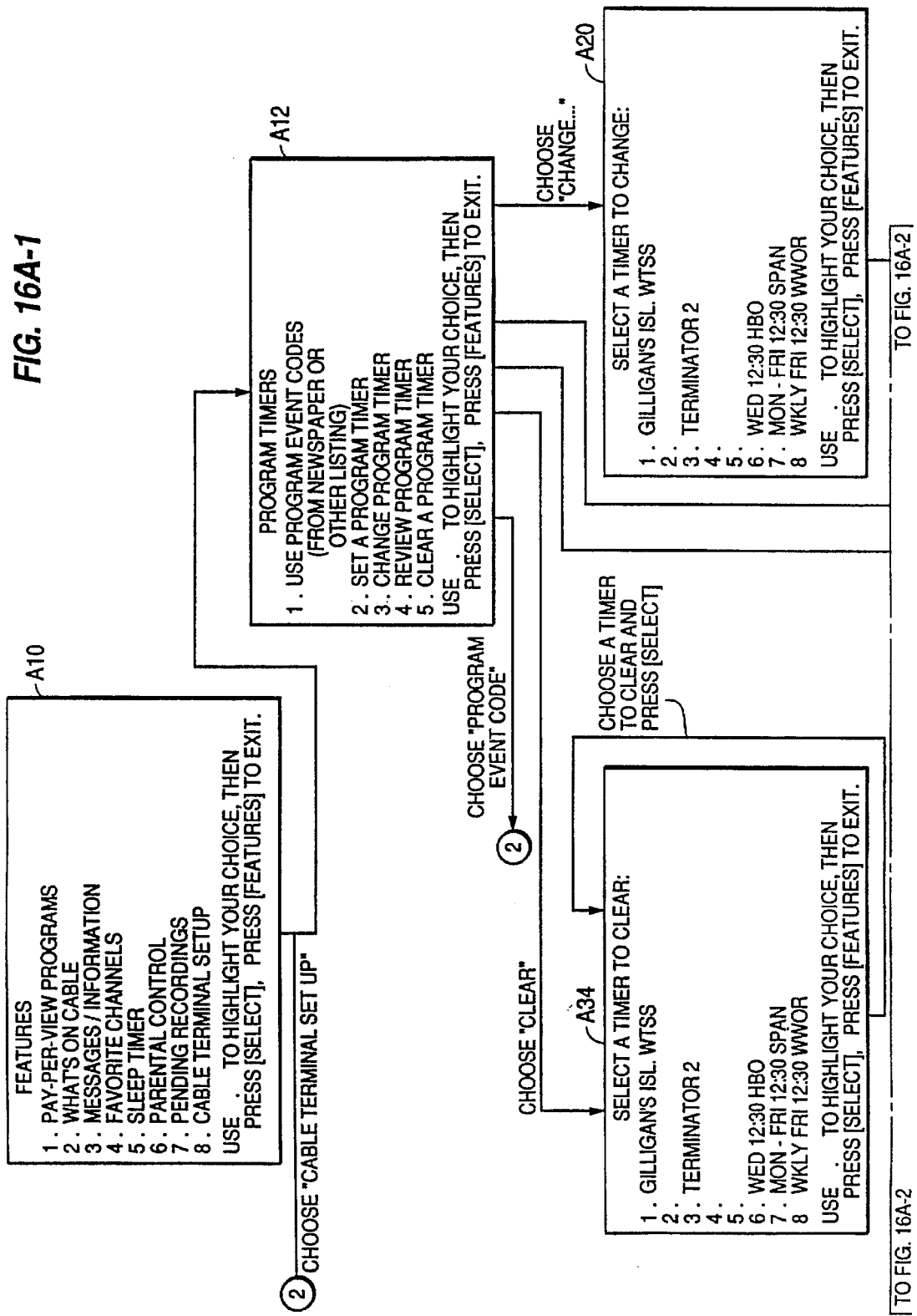

AUXILIARY DEVICE CONTROL FOR A SUBSCRIBER TERMINAL

The invention pertains generally to a subscriber terminal for CATV or other subscription television systems and is more particularly directed to a method and an apparatus for controlling and communicating with peripheral devices from a subscriber terminal.

The subscriber terminal, more commonly known as a set top terminal, is an integral component of subscription television systems. These subscription television systems can be cable television (CATV) systems, SMATV systems, multi-point, multi-distribution (MMDS) systems, or direct-to-home (DTH) systems. The subscriber terminals have conventionally provided the functions of tuning particular channels of the subscription system which are outside the subscriber's television receiver capability. Further, they provide conditional access to the particular subscription service through authorization codes and in many services provide tiering or authorization of particular channels of the service by descrambling or decoding.

More recently, the subscriber terminal has become user friendly by providing an interactive, on-screen display and other functions that allow the subscriber to manipulate the subscription service and his television receiver in additional ways. These features include such things as volume control, pay-per-view event confirmation, favorite channel listings, sleep timer features, viewing channel identification, parental control capability, program timers for recording VCR programs, and other types of consumer friendly operational features.

In addition, some of the on screen features found in newer television receivers can be provided for older television receivers by the subscription terminal. Modern subscription terminals are remotely controlled and provide this capability to the older television receiver. For example, channel identity, mute and remote volume control can be accomplished by the subscriber terminal under remote control making the television receiver appear to have these capabilities.

An advantageous example of a subscriber terminal with these advanced consumer features is the 8600 model series of subscriber terminals manufactured by Scientific-Atlanta, Inc. of Norcross, Ga.

Even with the advance in the user friendly features of such subscriber terminals, there have been some inconveniences in interfacing with other consumer devices, such as VCRs and television receivers, because of the incompatibilities in tuning capability and operation. For example, if a subscriber wants to automatically record a program on his VCR and that program is a premium event (it may have to be descrambled in the subscriber terminal), he must not only set the subscriber terminal program timer, but must also set the VCR program timer to ensure that it will be on and tuned to channel 3/4 which is the normal output of the terminal. To program both of these timers, the subscriber must after selecting the program event translate the event time and date into the interface language of each particular piece of equipment that he is using. While both the subscriber terminal and VCR may have user friendly interfaces to assist in the process, they generally will be quite different and cause considerable confusion for the subscriber.

Recently, there has been a service to assist in automatically programming a VCR which consists of a device to decode certain program event codes. These program event codes can be printed in TV program listings, such as in the newspapers or any of the TV program listing services. The subscriber selects a program from the listing and inputs the associated program event code to the VCR control device which translates the code into a date and time for the occurrence of the program. The device then generates infrared (IR) control commands to a VCR to turn the recorder on and off at the proper times.

Presently, this device does not interface seamlessly with cable television subscription services. If the subscriber connects the VCR through a subscriber terminal because he wants to view a scrambled event, the terminal will cause some inconvenience with this device in that its program timer must still be programmed with the date and time of the program event, but more importantly the channel to be tuned by the VCR must be the output of the terminal, such as channels 3/4 for NTSC. If the subscriber connects the VCR directly to the cable with this device, he can not record premium events and must determine whether the TV program listing from which he has taken the program event code has the same channel line up as his subscription service and must ensure that his VCR can tune that channel.

Therefore, it would be quite advantageous to provide a single subscriber equipment configuration which would seamlessly and easily program both the subscriber terminal and the VCR with a program event code. It would also be of advantage for the subscriber terminal to recognize programming sources and be able to translate these into the specific channel frequencies which a local cable system has assigned to them.

SUMMARY OF THE INVENTION

Therefore, it is an object of the invention to provide a peripheral communications and control interface for an auxiliary device connected to a subscriber terminal.

It is another object of the invention to provide an infrared (IR) peripheral controller as an auxiliary device which communicates with and is controlled by the peripheral interface.

It is still another object of the invention to provide control and communications between the subscriber terminal and the IR peripheral controller to control one or more types of VCRs.

Yet another object of the invention is to provide an apparatus for the automatic recording of a program event based on a program event code input to the subscriber terminal from an associated television program listing.

Accordingly, the invention provides a subscriber terminal for a subscription television service which includes a communications and control interface for auxiliary devices. The interface preferably comprises a four wire ribbon cable which provides a serial transmit line, a serial receive line and ground for bidirectional asynchronous digital communications. The fourth line is a power supply line which will source current from the subscriber terminal to an auxiliary device without an internal power supply.

Data, status and control transactions are defined for the communications and control interface including command transactions initiated from the subscriber terminal and reply transactions from the auxiliary devices. An auxiliary device which can be controlled in this manner is an IR peripheral controller which receives communications from the subscriber terminal and converts them to IR transmissions which can control any number of peripheral devices.

In an illustrated implementation, the interface and IR peripheral controller can be utilized in an apparatus for automatically recording a program event, whether it is scrambled or not. The system includes the subscriber terminal, the IR peripheral controller, a television receiver and a recording device, such as a video cassette recorder. A series of data, status and control transactions are defined between the subscriber terminal and the IR peripheral controller to implement this function.

In one transaction, the subscriber terminal sends the necessary data and control information to the IR peripheral controller to allow the controller to determine which specific VCR it is controlling. As the brands of VCRs (and number of models within a brand) proliferate, this feature allows a facile method of configuring the IR peripheral controller for any particular VCR. Because this function is accomplished with the assistance of the on screen display of the subscriber terminal, the feature permits the subscriber to communicate with a single user friendly interface for configuration.

A second transaction provides control commands to the IR peripheral controller to start and stop the VCR. The IR controller decodes these commands and translates them into the IR transmissions necessary to cause these functions in the VCR. With this feature, the conventional program timers of the subscriber terminal can be used to accomplish automatic recording of the program event. This feature is also assisted with the on screen display of the subscriber terminal so that the subscriber may communicate with a single user friendly interface.

As an additional feature, the system includes an apparatus for automatically recording a program event by means of a program event code which has been selected by the subscriber from an associated television program listing. The program event code which is a coded indication of the start time, duration of the event, and program source is input to the subscriber terminal. The program event code is then translated, either by the subscriber terminal, by the IR controller, or partially by each, into data which can be input to one of the program timers of the subscriber terminal.

Preferably, a third transaction is defined to translate the program event code into time, date, program length, and program source in the IR peripheral controller. This is accomplished by passing the program event code to the IR controller and receiving a reply containing the necessary information. This information is then loaded into one of the program timers of the subscriber terminal. When the time in the program timer elapses, the VCR is controlled to record the event and then stop.

The subscriber terminal includes a channel map which associates program sources with local cable channel numbers. The IR peripheral controller may also have a similar channel map which is programmable. A member of alternative embodiments are possible where, if the peripheral controller does not have a channel map, then a translation of the program source to the local cable channel by the subscriber terminal will take place before the information is stored in a program timer. If the IR peripheral controller has a programmable channel map, then the controller can return the local channel number instead of the program source. As a final embodiment, a transaction is defined to download the IR controller channel map with the channel map of the subscriber terminal so that the correct channel number is returned.

BRIEF DESCRIPTION OF THE DRAWINGS

These and other objects, features and aspects of the invention will be more clearly understood and better described if the following detailed description is read in conjunction with the appended drawings wherein:

FIG. 4 is a system block diagram of a peripheral communications and control interface between the subscriber terminal and a plurality of auxiliary devices;

FIG. 7 is a system block diagram of an apparatus for automatically recording a program event on a VCR utilizing the subscriber terminal, the interface, an IR peripheral controller, and a television receiver;

FIGS. 12 and 13 are pictorial representations of the command to decode a program event code from the subscriber terminal and the reply transaction from the IR peripheral controller to cause the automatic recording of a programmed event based on the event code for the apparatus illustrated in FIG. 7.

DETAILED DESCRIPTION OF THE PREFERRED EMBODIMENTS

Figure 1:
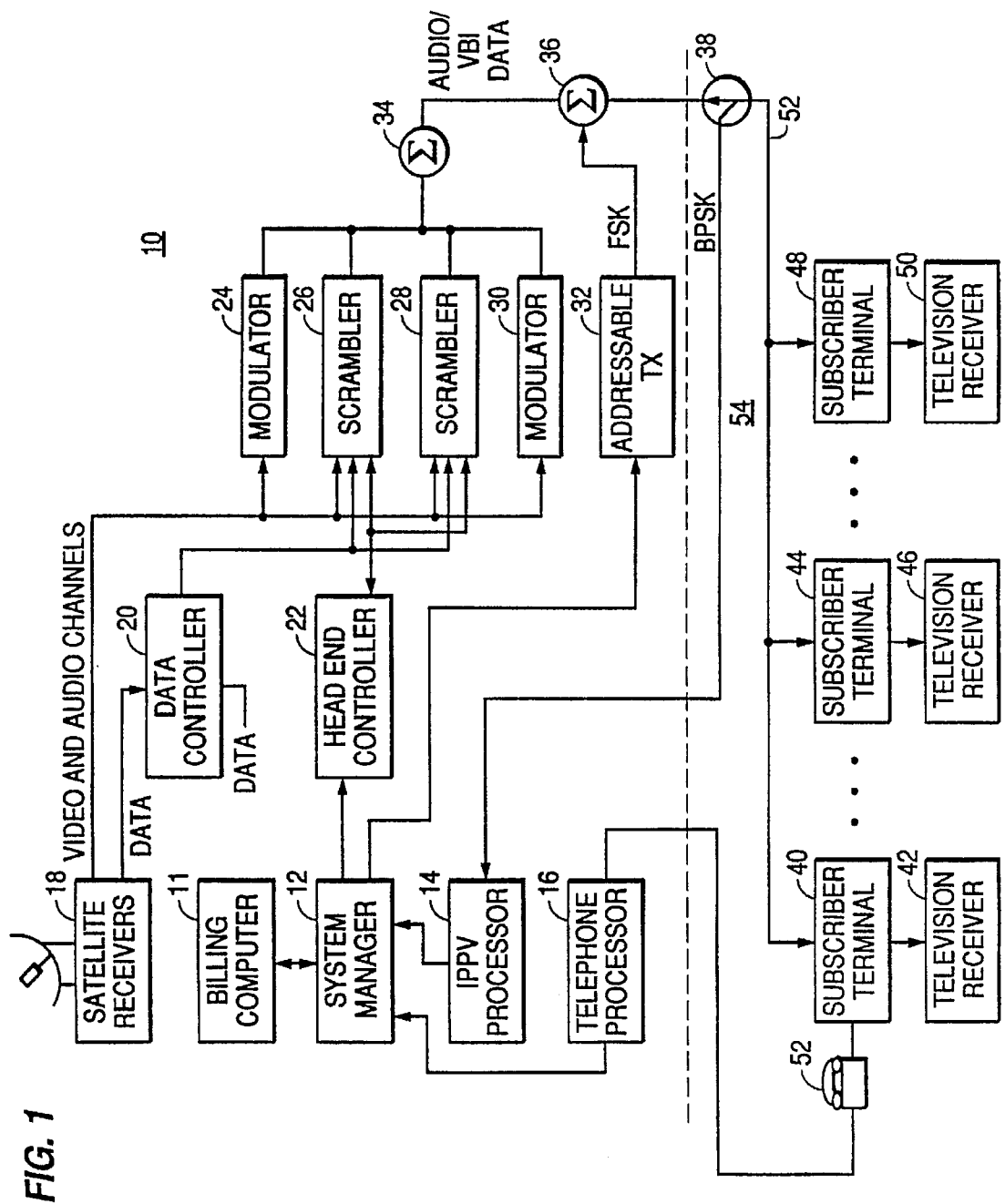
FIG. 1 is a system block diagram of a subscription television system of the CATV type which includes a multiplicity of subscriber terminals.

A subscription television system of the CATV type is more fully illustrated in FIG. 1. The subscription television system includes a headend 10 and a plurality of subscriber terminals 40, 44 and 48 which are connected over a distribution system 52. As is conventional, the distribution system 52 may include coaxial or optical fiber cable, system amplifiers, line extenders, etc. The headend 10 is under the supervision of a system manager 12 which controls a hardware controller, headend controller 22. A billing computer 11 communicates with the system manager 12 to authorize and transmit transactions to subscribers.

The television or other programming for the subscription system may come from a satellite downlink where it is decoded and demodulated by satellite receivers 18 into a number of channels. Each channel is either applied to a modulator 24 and 30 or a scrambler and modulator 26 and 28 which, under the control of the headend controller 22, remodulates the channels to the frequencies of the local subscription system channel line up. For a premium or restricted channel service (tiered, pay-per-view, or the like), some channels are scrambled by any of the known CATV methods by the scramblers and modulators 26 and 28. While the other channels can be transmitted without conversion. The program channels are then frequency division multiplexed onto the distribution system 52 by an RF combiner 34 as a broadband television signal. The plurality of channels of programming can then be transmitted over the distribution system 52 and supplied to each of the subscriber terminals 40, 44, and 48.

The scramblers and modulators 26 and 28 further may include the function of data insertion for its particular channel. This method of providing the data within the channel signal is generally termed in-band signaling. The data may be applied to any audio portion, video portion or both audio and video portions in combination, or any other portion of the television channel. Many subscription television systems have amplitude modulated data pulses on the audio subcarrier. Further, in other subscription television systems, data may be inserted into the vertical and/or horizontal blanking intervals of the video portion.

The data which is inserted into the television channel in this manner can be conditional access data to globally or locally address and control the subscriber terminals 40, 44 and 48, on screen text data, or other types of information from the headend controller 22. Other data and information, such as electronic program guides and information services, can be inserted into the channels from a data controller 20. The data controller 20 can receive local data or national data from the satellite downlink through the satellite receiver 18.

In addition, data can be transmitted over the distribution system 52 by out-of-band signaling. In this mode, the system manager 12 accesses an addressable transmitter 32 with transactions to transmit this data. The addressable transmitter 32 may be used to modulate a data signal on a frequency not associated with the television programming. The broadband television programming of the cable systems has generally been applied from 50 MHz to 550 MHz and above, while out-of-band signaling systems have been used in non-video portions of these signals, such as at 108.2 MHz with a frequency shift keying modulation technique. These transactions are combined with the broadband television signal at 36 and transmitted to the subscriber terminals 40, 44 and 48.

Transactions in the system are designated as addressed (to a particular subscriber terminal or group of subscriber terminals) and global (to all subscriber terminals). These transactions are in a standardized format which can be sent over any of the communication paths mentioned.

Signaling and data information may also flow in the reverse direction from the subscriber terminals to the headend via a reverse signaling path through the distribution system 52. In one form, the reverse signals are digital biphase shift keying (BPSK) modulated and applied to a frequency below 50 MHz. The signals flow back from the subscriber terminals to an IPPV processor where they are decoded. In addition, any of the subscriber terminals 40, 44 and 48 may include a modem and telephone link 52 to a telephone processor 16 at the headend 10. The information from processors 14 and 16 are directed to the system manager 12, which communicates to the billing computer 11 to obtain authorization and billing information. The reverse signaling system has generally been used for ordering pay-pay-view (PPV) or impulse-pay-per-view (IPPV) events. In the future the reverse signal path may be used for any number of additional interactive services.

Figure 2:
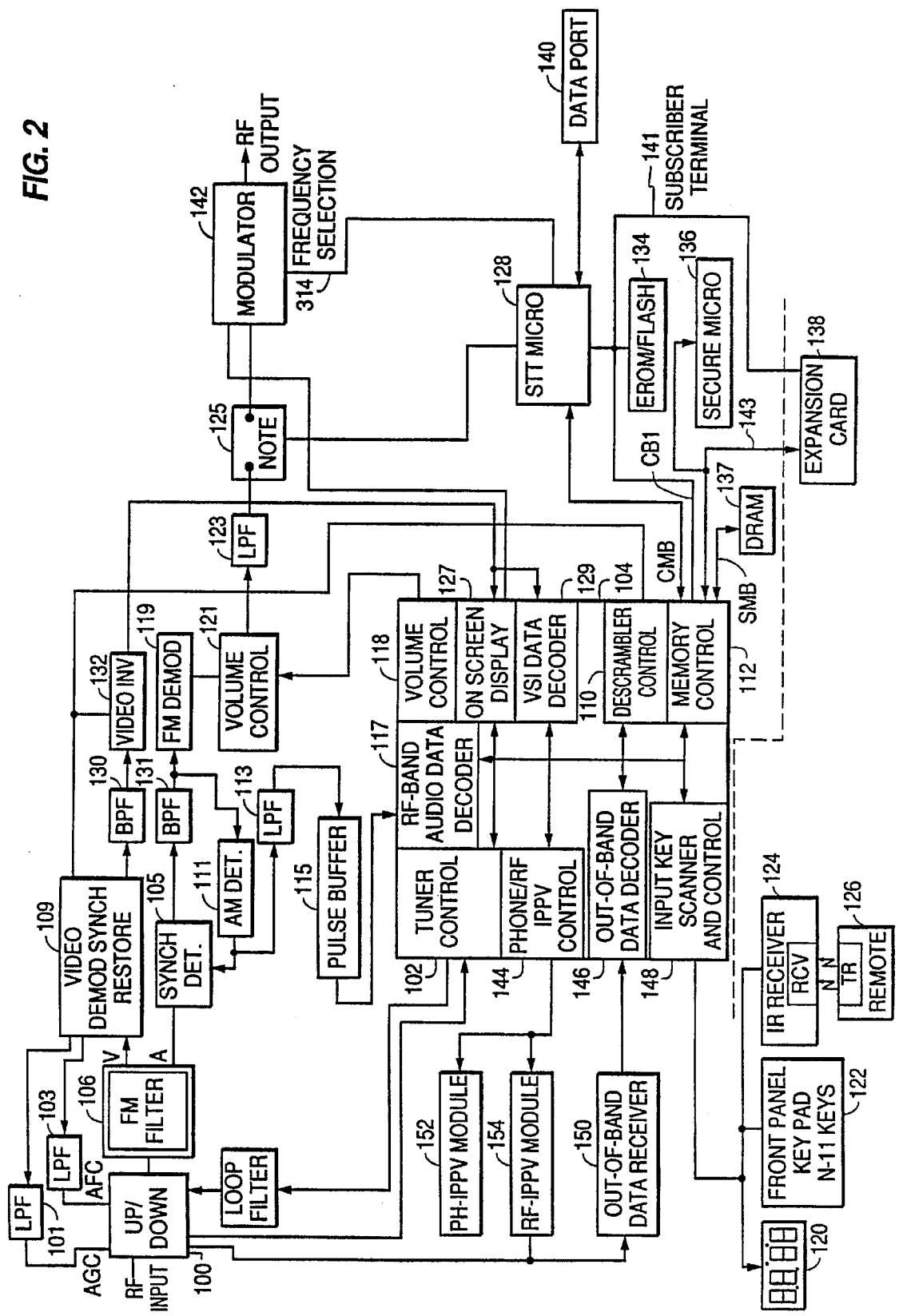
FIG. 2 is a detailed block diagram of one of the subscriber terminals of the system illustrated in FIG. 1.

Referring to FIG. 2, a detailed block diagram of one of the subscriber terminals, for example, the one indicated as 40 of the subscription television system will now be described. The broadband television signal from signal distribution system 52 is received at the input of up/down converter or tuner 100. An out-of-band data receiver 150 is also coupled to the broadband input. Conventionally, the up/down converter 100 may include an input filter, such as a diplexer, to separate the 108.2 MHz out-of-band signal and the broadband television signal. The up/down converter 100 can be tuned to a predetermined channel for receiving in-band video and audio data when not in use. The channel may be predetermined from the system manager 12 and, by one of the data transmission methods described herein, the predetermined channel identification can be stored in subscriber terminal 40.

When in use, the up/down converter 100 is tuned according to a channel entered by a subscriber via a user interface having an IR receiver 124, remote control 126 and terminal keypad 122. Up/down converter 100 uses a phase locked loop under the control of a tuning control 102 to convert the selected or predetermined default RF channel signal to a 45.75 MHz intermediate frequency signal. A multifunction control circuit (MCC) 104, preferably an application specific integrated circuit (ASIC) combining many subscriber terminal control and data handling functions into a single package, is linked to up/down converter 100 by a bidirectional link to the tuner control 102. The link has one path for timing and a return link for feedback control of the tuning process. A feedback signal for automatic gain control and one for automatic frequency control are transmitted to the up/down converter 100 through filters 101, 103, respectively from a video demodulator 109.

A filter, such as a SAW filter 106, filters the IF channel signal to split the signal into separate video and audio portions for further processing. The video portion is demodulated and descrambled by the video demodulator 109 under the control of a descrambler control 110 of the MCC 104. The video demodulator 109 performs the sync restoration (descrambling of the video signal) for sync suppression scrambling. The video signal then passes through a band pass filter 130 and to a video inverter 132 where inverse video inversion (descrambling) takes place. The descrambling of the video portion, whether sync suppression, sync inversion, video line inversion, etc. is under the control of the descrambler control 110 of the MCC 104. The descrambler control 100 provides the necessary timing signals, inversion axis levels, and whether the video is inverted or not to the video inverter 132 and supplies the necessary timing, restoration levels and identification of sync pulses to be restored to the demodulator 109. The descrambler control 110 usually receives such descrambling information from pulses as in-band audio data.

In the other path, the audio signal is converted from the 41.25 MHz IF carrier to the intermodulation frequency of 4.5 MHz by a synchronous detector 105. Feedback for automatic gain control of detector 105 is supplied from the output of band pass filter 131. The audio signal may then be demodulated by an FM demodulator 119. An amplitude modulation detector 111 performs pulse detection to recover the in-band audio data which are amplitude modulated onto the audio carrier. The recovered in-band pulses are supplied to an in-band audio data decoder 117 of MCC 104 for processing after being shaped by pulse shaper 115. The in-band data, except for descrambling data, is stored in DRAM 137 for buffering. Descrambler control 104 accesses descrambling data directly for the video descrambling operation. Volume control of the audio signal is performed under the control of a volume control 118 of the MCC 104 and the microprocessor 128 as described in U.S. Pat. No. 5,054,071, incorporated herein by reference. After volume control, the audio signal is passed through a low pass filter 123 and a mute switch 125. The output of the mute switch 125 is applied to a modulator 142.

The MCC 104 receives the video signal after demodulation and descrambling and strips the in-band video data from the VBI of the signal with a VBI decoder 129. The in-band video data is transmitted at a frequency on the order of known teletext systems, such as about 4.0 megabits per second, and a data clock provides an appropriate sampling frequency higher than the Nyquist rate according to well known techniques. The in-band decoder 129 stores the data in DRAM 137 prior to processing by the microprocessor 128, the DRAM 128 serving as a data buffer.

The output of video inversion control 1232 is also supplied to an on screen display control 127 of the MCC 104. The on screen display control 127 selectively generates on screen character and graphic displays in place of or overlaid on the video signal. The modulator 142 combines the video signal from the output of the on screen display control 127 and the audio signal from the output of the mute circuit 125 and converts the combined signal to the channel frequency selected by the microprocessor 128, such as channel 3/4 for NTSC. The combined and remodulated signal is supplied as an RF output to a television receiver in well known manner.

A control microprocessor 128 controls the overall operation of the subscriber terminal 40. The subscriber communicates to and controls the microprocessor 128 through an interactive user interface with an on screen display. The user interface includes a keyboard 122 on the front panel of the subscriber terminal 40 and the remote 126 which generate subscriber control signals for channel tuning, volume level control, feature selection, and the like. These subscriber control commands are decoded by an input scanner and control 148 of MCC 104. The remote IR receiver 124 of the user interface receives the commands from the infrared (IR) or other remote control 126, as is well known in the art, and provides commands to the microprocessor 128. The user interface additionally includes a 4 digit, 7 segment LED display 120 which displays the tuned channel numbers and diagnostics.

When the keypad 122 or IR remote control 126 is utilized to select a command, the microprocessor 128 operates to execute the command. For example, this operation may be to instruct the tuner control 102 to appropriately control up/down converter 100 to tone a selected channel. The subscriber terminal interacts with the subscriber by providing numerous on screen displays which assist in the operation of the terminal. The on screen displays provide information and prompts to guide the subscriber through many of the complex features of the terminal.

The descrambler control 110 of the MCC 104 utilizes recovered descrambling data to generate appropriate control signals, for example, inversion control and equalizing, sync restoration or regeneration for descrambling, or otherwise restoring the input baseband television signal. A secure microprocessor 136 determines whether the descrambler control 110 of MCC 104 carries out descrambling on a particular channel or what form of descrambling is required at a particular time by interpreting the authorization and control data downloaded from the system manager 12 (by any of the three data transmission schemes discussed herein, out-of-band, in-band audio or in-band video) into the internal NVM memory of the device. The non-volatile memory (NVM) in the secure microprocessor 136 stores secure data, for example, authorization data, scrambled channel data, scrambling mode data, some terminal configuration data and other required data.

The control microprocessor 128 operates by running a control program which preferably is partially stored in a read-only memory internal to the processor and partially stored in a non-volatile memory such as Flash EPROM memory 134. In addition, the control program of the control microprocessor 128 may also reside in the non-volatile memory of an expansion card 138. The microprocessor 128 communicates with the non-volatile memory 134 and 138 via a memory bus 141 which has data, address, and control lines. In addition, the microprocessor 128 controls the data decoders 117, 129 and 146 and the tuner control 102, volume control 118, on screen display control 127, descrambler control 110 and input key scanner and control 148 via commands through MCC 104 and control microprocessor bus (CMB) 131. The microprocessor 128 also directly controls the mute switch 125 and the output frequency selection of the modulator 142. The microprocessor 128 includes additional capacity for other auxiliary device communications and control through a data port 140.

The memory control 112 permits data coming from the three data decoders 117, 129 and 146 to be placed in a volatile memory such as DRAM 137. There it can be accessed by the control microprocessor 128 via the CMB 131. The MCC 104 also distributes control instructions from the control microprocessor 128 to the other parts of the MCC 104 to provide operation of the rest of the subscriber terminal 40. The MCC 104 additionally connects to a secure microprocessor bus (SMB) 143 which permits communications between the secure microprocessor 136 and other portions of the subscriber terminal 40. The SMB 143 is further coupled to the expansion card 138 to provide renewable security.

The memory control 112 and microprocessor interfaces of the MCC 104 are the central communications facility for the control microprocessor 128 and the secure microprocessor 136. The memory control 112 receives requests to write to memory or read from memory from the microprocessors 128, 136 and the other controls and data decoders. It resolves contentions for memory transfers, giving priority to real time applications and the microprocessors, and schedules the data flow. The microprocessors 128 and 136 communicate through internal registers of the MCC 104 with the memory control 112 and other portions of the MCC.

The expansion card 138 is a printed circuit card which contains memory and/or secure microprocessor components, which can be plugged into a connector 200. The connector 200 electrically extends the control microprocessor memory bus 141 and the secure microprocessor bus 143 to the expansion card 138. Additional program or data memory, or renewed security can be provided by the expansion card 138.

The subscriber terminal may optionally include an impulse pay-per-view (IPPV) module of either the telephone type 152 or the RF-IPPV type 154. The IPPV module allows the subscribers to request authorization of their subscriber terminal 40 to receive pay-per-view events, store the data associated with the purchase of the event in the non-volatile memory of the secure microprocessor 136, and then transmit the data to the system manager 12 via the telephone return path or the RF return path via the signal distribution system 52.

Figure 3:
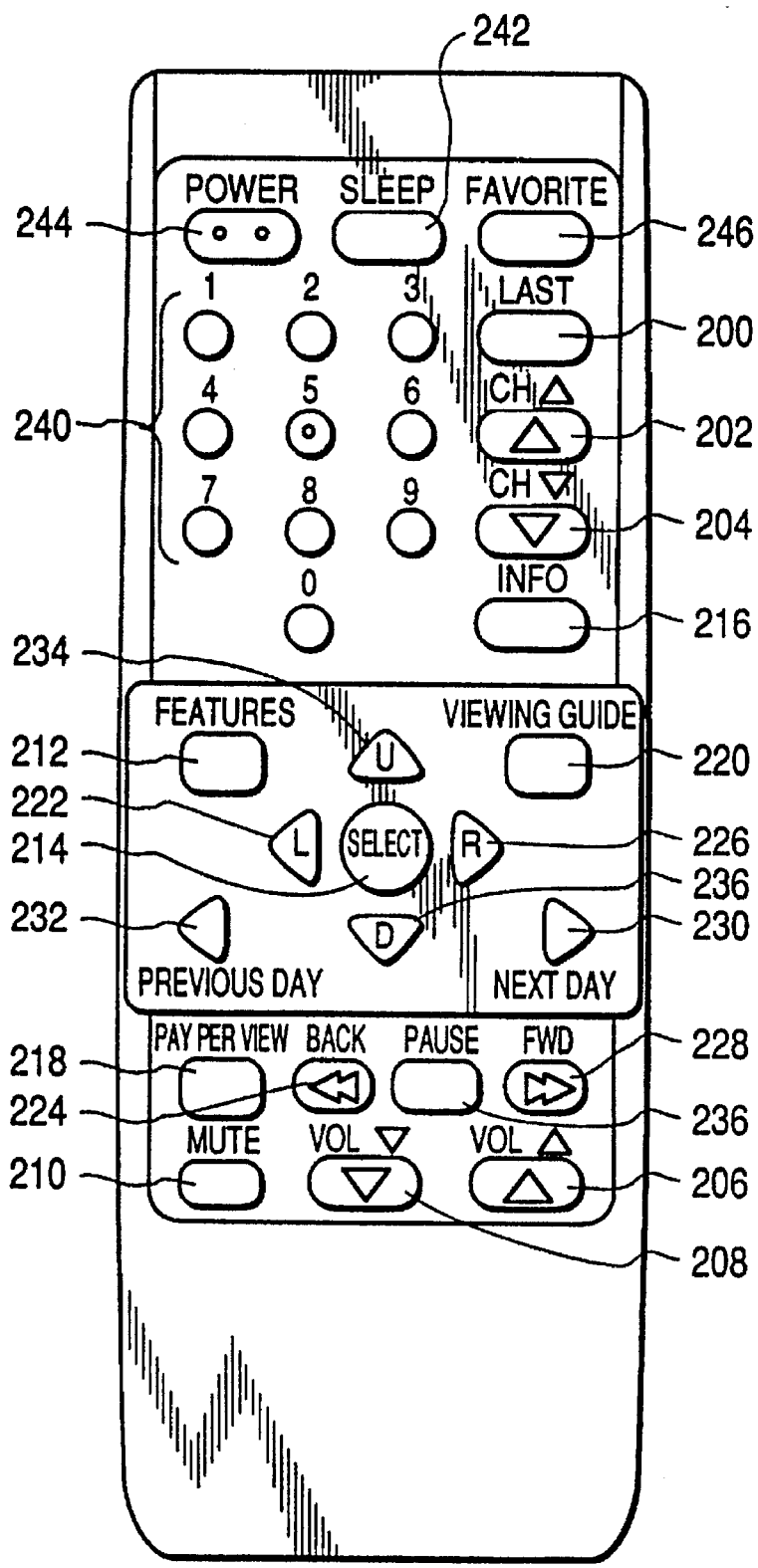
FIG. 3 is a pictorial representation of the key functions of the remote control of the subscriber interface to the subscriber terminal illustrated in FIG. 2.

FIG. 3 illustrates the key configuration of the remote control 126 of the user interface. The remote control keys are a part of the interactive user interface which in combination with the on screen displays provides a user friendly environment for the subscriber and a facility of use for the features of the subscriber terminal 40. The keys direct the subscriber terminal 40 to operate in the following manner.

The LAST key 200 toggles the tuning of the subscriber terminal 40 between the last two previously viewed channels. In the features mode, this key will cause the subscriber terminal 40 to return to the previous on screen display. The CH (up) key 202 increments the channel tuned for the subscriber terminal 40. While in the program guide feature, this key moves the cursor down by one channel. The CH (down) key 204 decrements the channel tuned for the subscriber terminal 40. While in the program guide feature, this key moves the cursor up by one channel. The VOL (up) key 206 increases the volume, except when the volume is muted, in which case the key restores the last volume setting. The VOL (down) key 208 decreases the volume, except when the volume is muted, in which case it restores the last volume setting. The MUTE key 210 toggles the volume mute feature where if the volume is muted, it becomes normal and if the volume is normal, it becomes muted.

The FEATURES key 212 accesses the initial on screen menu when the subscriber terminal is on. From within a menu, this key cancels the feature mode and removes all on screen menus. The SELECT key 214, in an on screen menu, initiates the action pointed to by the highlight, or causes the terminal 40 to do what is defined on the screen. This key also terminates direct channel entry if pressed before all digits are entered. The INFO key 216, when pressed while terminal 40 is in the on mode, causes time, channel number, program content and program source information to overlay the transmitted video for 4 seconds. The key also displays sleep timer status. When the key is pressed in the viewing guide mode, a detailed description of the highlighted program appears. The PAY-PER-VIEW key 218, when the subscriber terminal is timed to an IPPV channel with a program event with a purchase window open, initiates a buy sequence for that event. When not tuned to an IPPV channel, this key accesses up the theater feature menu.

The VIEWING GUIDE key 220 accesses the viewing guide feature menu any time the subscriber terminal is on and not in another on screen menu. From within the viewing guide feature menu, this key cancels the activity and removes the viewing guide feature menu. The LEFT key 222, while in the program guide feature, moves the cursor to the left 30 minutes. In an on screen menu, this key moves the highlight bar to the left if there is more than one column of available selection. The BACK ARROW key 224, during the NVOD events, takes the subscriber to a later showing (which is earlier in the event by one offset time increment). The RIGHT key, 226 while in the program guide feature, moves the cursor to the right 30 minutes. In an on screen menu, this key moves the highlight bar to the right if there is more than one column of available selection. The FORWARD ARROW key 228, during NVOD events, takes the subscriber to an earlier showing (which is later in the movie by one offset time increment).

The NEXT DAY key 230, while in the program guide feature, moves the entire screen to the right by one day (24 hours). The cursor returns to the upper left hand cell of the screen. The PREVIOUS DAY key 232, while in the program guide feature, moves the entire screen to the left by one day (24 hours). The cursor returns to the upper left hand cell of the screen. The UP key 234, while in the program guide feature, moves the cursor up one channel. In an on screen menu, this key moves the highlight bar up to the next available selection. The DOWN key 236, while in the program guide feature, moves the cursor down one channel. In an on screen menu, this key moves the highlight bar down to the next available selection. The PAUSE key 238, during NVOD events, causes the current showing of the event to pause until the next start time.

The Numeric Keys (0–9) 240, within menus requesting channel numbers, directly enter channel numbers. During the parental control feature, IPPV access and other number entries, these keys enter identification codes. The POWER key 224 toggles the subscriber terminal 40 on and off. The SLEEP key 242 causes the sleep timer on screen display and menu options to appear. The FAVORITE key 246 tunes the subscriber terminal to a preselected channel chosen by the subscriber.

FIG. 4 illustrates a system block diagram of the subscriber terminal 40 with a communications and control interface 306. The interface 306 is the external connection for the data port 140 (FIG. 2). The subscriber terminal 40 may communicate with and control any of a plurality of auxiliary devices 300, 302 via the interface 306. Alternatively, the subscriber terminal 40 may be controlled by any of the auxiliary devices via the interface 306. The interface 306 is a flexible, bidirectional communications path which can send status, data and instructions to any of the auxiliary devices 300, 302 and receive commands, status, and data from any of the auxiliary devices.

One particularly advantageous auxiliary device can be a peripheral controller 300, preferably an IR peripheral controller, which receives data and commands from the subscriber terminal 40 and controls a controlled device 304 via an IR protocol. The controlled device 304 in typical fashion may be a VCR, a television set, a digital music terminal, or any other consumer device normally found within the proximity of the subscriber terminal 40. Any consumer device may also be controlled from the subscriber terminal 40 over the interface 306 by direct connection rather than by IR coupling.

Figure 5:
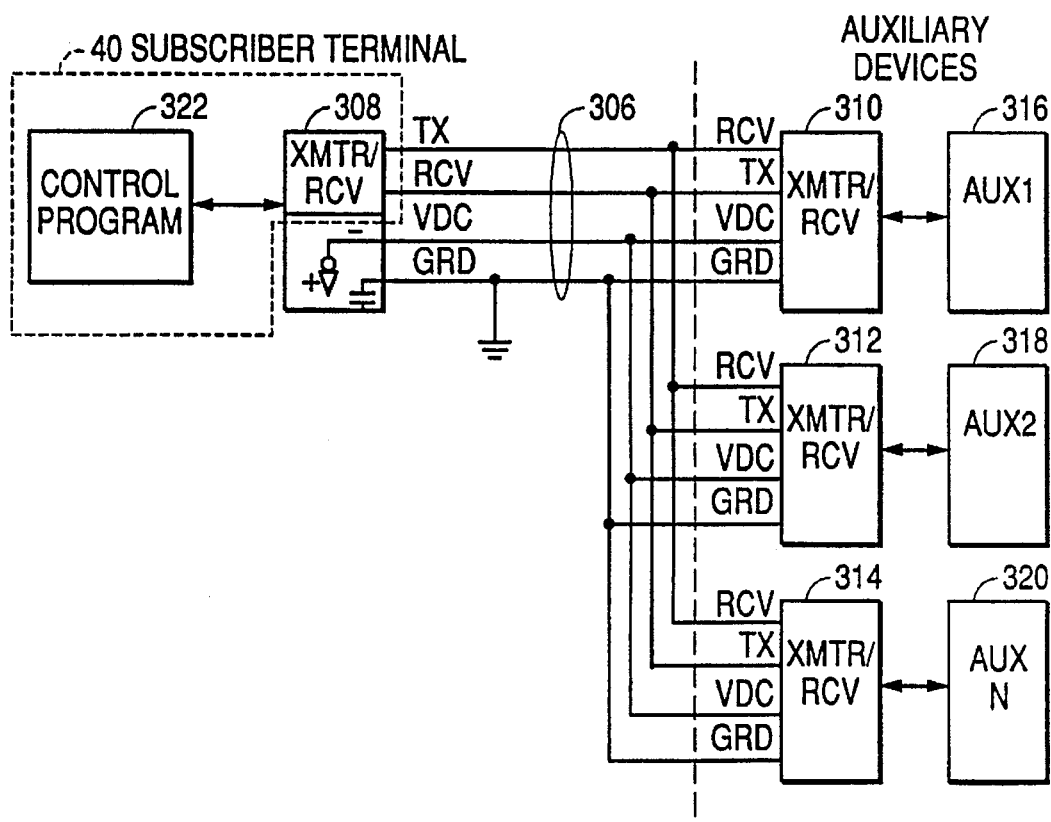
FIG. 5 is a detailed electrical schematic diagram of the interface illustrated in FIG. 4.

FIG. 5 illustrates the detailed electrical configuration of a preferred implementation of the interface 306 as a bus. The preferred implementation of the bus is a four conductor ribbon cable having a transmit line Tx, a receive line RCV, a power line VDC and a ground line GRD. The subscriber terminal 40 has a transmitter/receiver 308 which transmits on the transmit line Tx to all the transmitter/receivers 310, 312 and 314 of the auxiliary devices 316, 318 and 320. The transmitter/receiver 308 of the subscriber terminal 40 receives replies over the receive line RCV from all transmitter/receivers 316, 318 and 320 of the auxiliary devices. The common ground line GRD is connected to all the transmitter/receivers. The common power line VDC is used to power the auxiliary transmitter/receivers 310, 312 and 314 and/or the auxiliary devices 316, 318 and 320 if they do not have a power supply of their own. Preferably, the transmitter/receiver 308 of the subscriber terminal 40 is a data port driver program that controls information to an I/O port of the control microprocessor 128. The driver program communicates with the control program 332 of the microprocessor 128 to transmit and receive the data.

Figure 6:
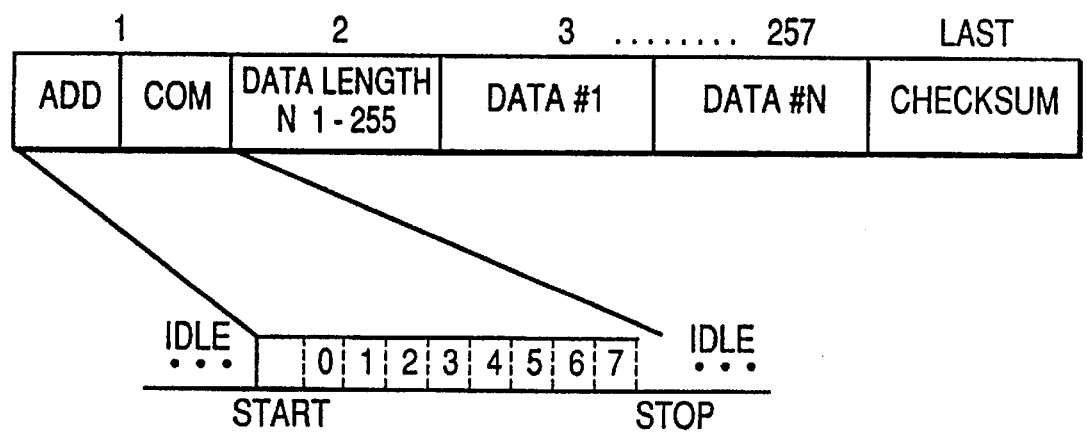
FIG. 6 is a pictorial representation of the communications protocol among the subscriber terminal and the auxiliary devices which is communicated over the interface illustrated in FIG. 5.

The communications protocol among the subscriber terminal 40 and auxiliary devices 300, 302 is provided by an asynchronous communication protocol consisting of subscriber terminal initiated command transactions and auxiliary device reply transactions over the interface 306. The transactions can be up to 258 bytes in length. All the bits are transmitted at 9600 bits/sec with 0 volts being a logic 0 and 5 volts being a logic 1. As shown in FIG. 6, a standard NRZ data format is used with 10 bits. The transmit Tx line is low prior to a message transmission and a start bit (logic 1) is transmitted as the first data bit in a character. An 8 bit data byte is then transmitted with the least significant bit first followed by the last bit in a character, a stop bit (logic 0). Between each character is a break which is a high level (logic 1) for 10 bit times. The protocol states that once a command transmission has taken place, a reply transaction must begin within 500 msec after the subscriber terminal 40 initiated the transaction. If not, another subscriber terminal initiated transaction will be transmitted. If, after another 500 msec, an auxiliary device 300, 302 does not respond, the subscriber terminal 40 will display an on screen message indicating a communication problem. The subscriber terminal 40 may initiate a new transaction within 100 msec after a completed transmit/reply sequence.

The format of command transactions in this protocol is that shown in the upper portion of FIG. 6, where the first byte is divided into 4 bits of an address and 4 bits of a command code identifier. The addresses are used to determine the particular auxiliary device to which the transaction is directed and the command code is to indicate to the device what function or transaction is to take place. After the command code is one byte a data length field which can range from 1 to 255. Following the data length field are the number of data bytes indicated in that field. The last byte in each transaction is a checksum. A reply transaction from an auxiliary device 300, 302 has a similar format in that it is addressed to the subscriber terminal 40 and contains the type of reply which is being sent to the terminal. In addition, multiple bytes of data may be returned by indicating the number of the data bytes in the data length field of the reply transaction. Finally, the reply transaction will terminate with a byte of checksum.

FIG. 7 illustrates a preferred embodiment of the invention which provides an apparatus for the automatic recording of a program event on a video cassette recorder 350. In the figure there is shown the subscriber terminal 40 which outputs a program on channel 3/4 to the input of the VCR 350. The subscriber terminal 40 communicates with the IR controller 300 to produce the necessary IR control and instruction codes to turn the VCR off and on at the correct time, and to tune the channel output from the subscriber terminal 40. A television receiver 352 is connected to the output of the VCR 350 so that the subscriber may view the program event as it is happening and simultaneously record the program event on the VCR.

In the configuration shown, the subscriber uses the on screen display features of the subscriber terminal 40 to determine a program event which he wishes to watch in the future. This selection process is an interactive session with the subscriber terminal 40 using the remote control 126. The selection process causes a program timer to be set in the subscriber terminal which is programmed with the time of the broadcast of the program event and the channel which it will be broadcast on. At the broadcast time the subscriber terminal 40 will automatically tune to the channel of the program event set in the program timer and further will control the VCR 350 to record the event via the IR peripheral controller 300. In one embodiment, the program timer is set through an on screen interface session and in another embodiment a program event code correctly enters the program event data into the program timer.

Figure 8:
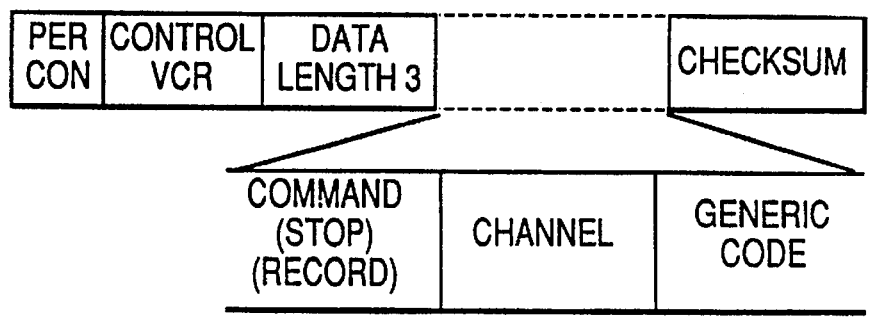
FIGS. 8 and 9 are pictorial representations of a command transaction to control the VCR from the subscriber terminal and the reply transaction from the IR peripheral controller for the apparatus illustrated in FIG. 7.

When the auxiliary device is an IR peripheral controller 300, a particular group of transactions has been developed for the apparatus of FIG. 7 to more advantageously automatically record a program event. These transactions are more fully described with respect to FIGS. 8-14 and are in the protocol of the interface 306. The first transaction in FIG. 8 is a command to control the VCR and comprises an address and command byte which indicates that the transaction is addressed to the IR peripheral controller 300 and is for control of the VCR 350. The transaction is 3 data bytes in length which is indicated in the data length field. The 3 bytes to produce the control of the VCR are 1 byte which is a VCR command such as stop (end recording) or start (record), a second byte indicating the channel to which the VCR is to tune, and a generic code indicating the VCR brand and model. The channel number that the VCR 350 must tune is typically channel 3 or 4 depending upon what is set for the output from the subscriber terminal 40.

Figure 9:
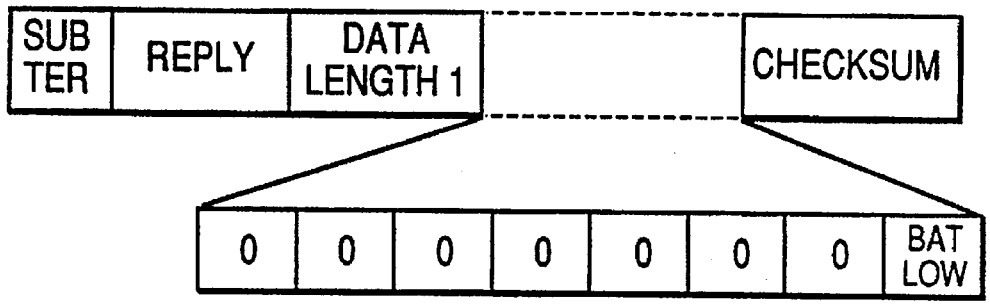

The standard reply to the subscriber terminal 40 for a VCR control command is a reply transaction as more fully shown in FIG. 9. The reply transaction shown is a standard reply that the VCR control transaction was properly received. It consists of the subscriber terminal address, a reply identifier, a data block length of 1 byte, and a checksum byte. The data byte is all zeros except for the most significant bit which indicates whether the battery in the IR peripheral controller is low or not. If the bit is set, the battery is low. If the bit is not set, the battery is okay.

The second type of VCR transaction is a transmission to the IR peripheral controller 300 of a program event code. The program event code transaction is more fully illustrated in FIG. 10 and begins with an address nibble and command nibble, indicating that the transaction is addressed to the peripheral controller 300 and is a program event code, respectively. The number of data bytes in this transaction is 12, where the first four and one half bytes are BCD digits indicating a program event code and the last nibble in byte 5 is the number of non zero program event code digits. Bytes 6-8 indicate the current time and 9-11 indicate the current date. An event code is a coded series of digits requiring a translation algorithm to be stored in the IR controller 300. Depending on the algorithm, the translation routine may need the actual time of the translation. This actual time is provided by the subscriber terminal so it is not necessary to build a real time clock into the controller 300. Byte 12 is reserved for future use.

In response to the program event code command transaction, the IR peripheral controller 300 returns with a program event timer reply transaction as seen in FIG. 13. This reply transaction indicates that the IR peripheral controller 300 has translated the program event code into the information needed to program the program event timers within the subscriber terminal 40. It begins with an address nibble directed to the subscriber terminal 40 and an identification nibble to indicate it is a program event timer response. The data length field indicates there are 8 data bytes in the reply transaction. The first two bytes indicate the start time of the program event in hours and minutes, while the bytes 3-5 indicate the date of the program event occurrence. Bytes 6 and 7 indicate the program event length in hours and minutes and byte 8 indicates which channel (source) the particular program event will be broadcast on. The time of the broadcast is the start time and the event length allows one of the program timers of the subscriber terminal 40 to determine the stop time. Byte 1, bit 3 acts as an indication of whether the program event code was recognized by the translator of the IR controller 300 and bit 2 allows the controller to return information about whether its battery is low, the same way that it does in a standard reply transaction. Byte 8 returns either the channel number of the program event, if it has a programmed channel map, or the source of the program event, if it does not have a channel map or if the channel map is not programmed.

It is evident that the subscriber terminal 40 could translate the program code directly. If this the case, then the program timer is loaded with the translated information without use of this transaction. However, it is advantageous because there may be several different translation algorithms from different IR controller manufacturers and this transaction facilitates the use of all of them.

Figure 10:
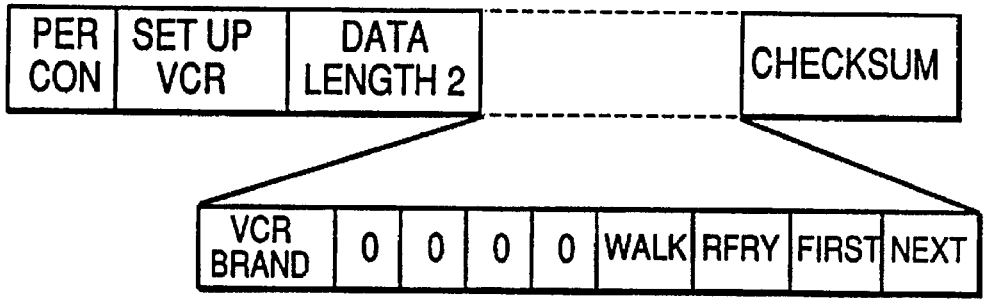
FIGS. 10 and 11 are pictorial representations of a command transaction to configure the parameters of the IR peripheral controller from the subscriber terminal and the reply transaction from the IR peripheral controller for the apparatus illustrated in FIG. 7.
Figure 11:
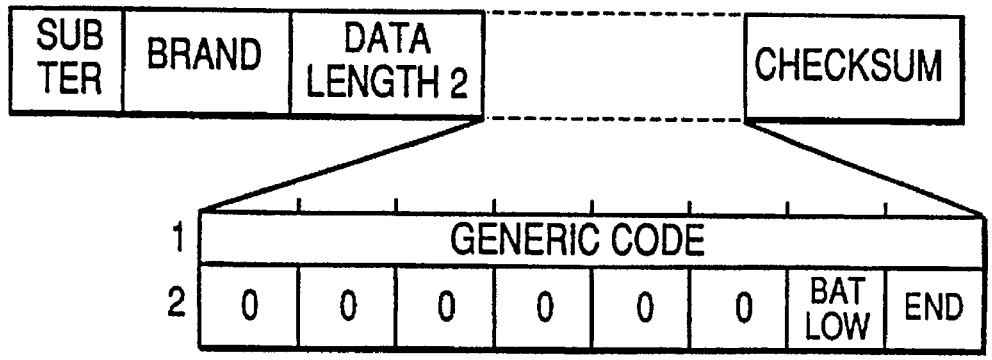

A third type of transaction is shown in FIGS. 10 and 11 and permits the IR peripheral controller 300 to be configured to control a particular brand and model of VCR 350. As is conventional, the IR peripheral controller contains an extensive list of IR codes for particular models and brands of consumer devices, particularly the VCR 350. This transaction assists in the selection of one of these codes to control the VCR 350. The set up VCR transaction beans with the nibble addressed to the IR peripheral controller 300 and a command nibble to configure the VCR 350. The transaction consists of 2 data bytes which are indicated in the data length field. The first byte is a VCR brand byte and the next byte has four control bits which in order are termed the next bit, the first bit, the retry bit and the walk bit. If the WALK bit is set, this command tells the IR peripheral controller 300 to try a VCR brand. The subscriber terminal 40 tries the IR codes by generating a start VCR transaction with the code. If the VCR responds, the correct IR code has been found and the IR peripheral controller 300 is correctly configured. If the FIRST bit is set, the IR peripheral controller 300 will try the first model code for that brand. On subsequent cycles, the NEXT bit will be set high and the IR peripheral controller 300 will try other model codes for that brand. If this transaction is sent with the RETRY bit high, the IR peripheral controller 300 will attempt to start the VCR 350 with the last model code. When the last IR code for a particular brand has been tried, the END bit in the brand reply transaction will be set high.

If the WALK bit is set high, and the FIRST bit is set high, the IR peripheral controller 300 will try the first combination of brand and model codes. On subsequent tries, the WALK and NEXT bits shall be sent high, causing the IR peripheral controller 300 to try the next brand and model codes. The VCR brand information sent in the command the transaction is ignored if the walk bit is high. When the END bit is returned high, the subscriber terminal 40 will tell indicate to the subscriber with an on screen display that there are no more choices available in that brand, and then request whether the subscriber would like to try all possible choices. If the subscriber answers by highlighting and selecting the yes on the screen, the subscriber terminal 40 will start using the WALK bit in the transaction to try all VCR brand and model codes.

In reply to the set up VCR command transaction, the IR peripheral controller 300 will return the brand reply transaction as set forth in FIG. 11. The brand reply transaction begins with a subscriber terminal address nibble and a brand reply command nibble. The data length in the data length field is 2 bytes and is followed by a checksum byte. The first data byte of the brand reply transaction is the generic code of the VCR brand which the IR peripheral controller 300 is checking and the second data byte is used to provide two control bits which indicate whether the battery of the controller is low and whether the end of the model types for a particular brand has been reached.

Figures 14, 15:
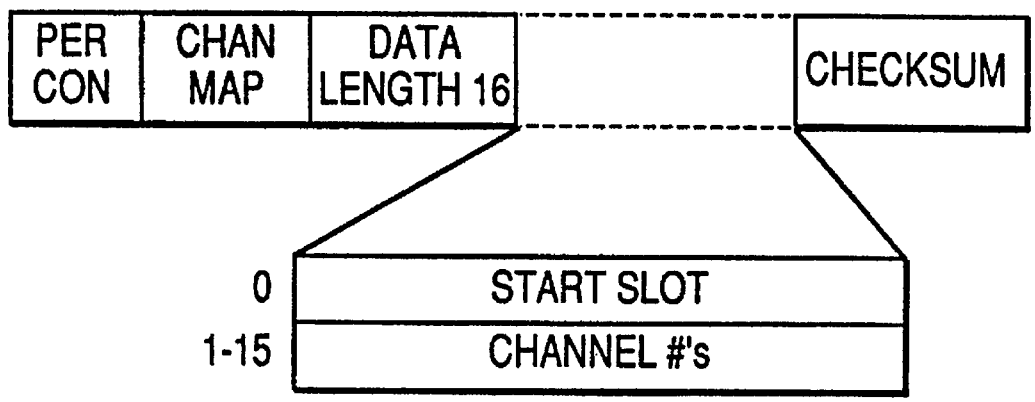
FIG. 14 is a pictorial representation of the command transaction to store the channel map from the subscriber terminal into the channel map space within the IR peripheral controller for the apparatus illustrated in FIG. 7.
FIG. 15 is pictorial representation of the channel map of the IR peripheral controller.

FIG. 14 illustrates a channel map transaction between the subscriber terminal 40 and the IR peripheral controller 300. The channel map transaction is to allow the subscriber terminal 40 to pass the correct channel numbers of the local cable system to the IR peripheral controller 300. A local channel mapping is downloaded into the subscriber terminal 40 based upon the channel line up of the local cable system when it is first placed in service, periodically, or when there is a change in such line up. The channel map transaction has an address nibble which indicates the IR peripheral controller 300 is the destination for the transaction and an identifier nibble that indicates it is a channel map transaction. The data length of the transaction is 16 bytes which is indicated in the data length field and the transaction ends with a byte of checksum. Byte 0 of the data is the particular starting channel slot which the following 15 bytes of channel number data are to be loaded into. The IR peripheral controller 300 replies with a standard reply such as that shown in FIG. 9.

In FIG. 15, the IR peripheral controller 300 may store a channel map in its memory which comprises a number of channel slots, 1–240. Each channel slot is associated with a particular program source such as the broadcast networks CBS, NBC, ABC, and the cable networks TBS, USA Network, Cinemax and MTV. Further, there are channel slots for program providers in the premium or tiered class, such as HBO, ESPN and American Movie Classic. This is in a typical CATV channel line up but is exemplary only, as the channel map could have any actual CATV channel assigned to any program providers. From its channel map and knowledge of the structure of the map of the controller, the subscriber terminal 40 downloads the channel numbers into the channel map of the IR peripheral controller 300 by providing 15 channels numbers per transaction. The start slot information in byte 0 of the transaction will tell the IR peripheral controller 300 where to begin the storage. The first channel number will be stored in the identified slot and the next channel numbers are then sequentially stored in the map. This permits the program source information of the program event code to be translated into local channel frequency information. If the IR peripheral controller 300 does not have a channel map, or the channel map is not programmed (downloaded from the subscriber terminal 40 or manually), then the program event source data is translated in the subscriber terminal 40. It is evident that if the controller 300 does not have a channel map this transaction it not used.

The transactions between the subscriber terminal 40 and IR peripheral controller 300 are used in combination with a sequence of on screen displays and interactions by the subscriber with the user interface for providing the automatic recording operation. The program timer features of the subscription terminal 40 are used individually and assist in entering program event codes for control of the IR controller 300 and consequently VCR 350. In general, as seen in FIG. 14A–C, the program timer feature is menu item 5 in the features menu in block A10. The features menu is the main menu that is displayed on screen by selecting the features key 212. The selection of menu item 5 (by highlighting it and pressing the select key 214) will cause the program timer screen shown in block A12 to be displayed on the television receiver 352. The program timer screen provides a menu with five subscriber choices. From this menu a program timer may be set or changed, or a program timer cleared. Additionally, the subscriber may wish to just review the program events that he has programmed. The menu further provides for allowing the subscriber to enter program event codes. This is the easiest method of automatically recording a program event with the VCR 350 and, therefore, it is placed in the first position on the program timer menu.

Figures 2, 16A:
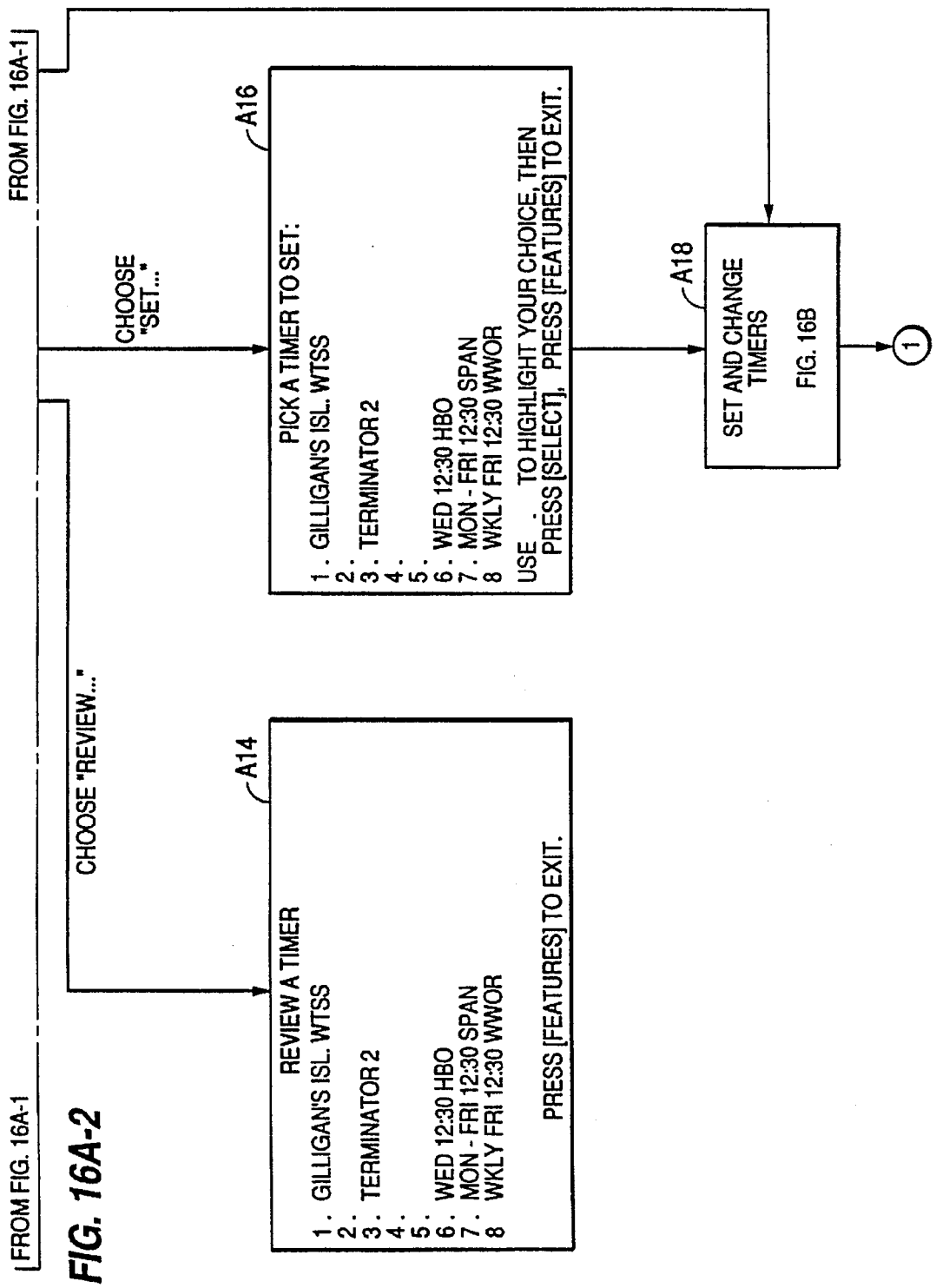
FIGS. 16A–C are a system flow chart of the on screen operations of the subscriber terminal in the system illustrated in FIG. 7 utilizing the interface and transactions illustrated in FIGS. 8, 9, and 12–15.
Figure 16B:
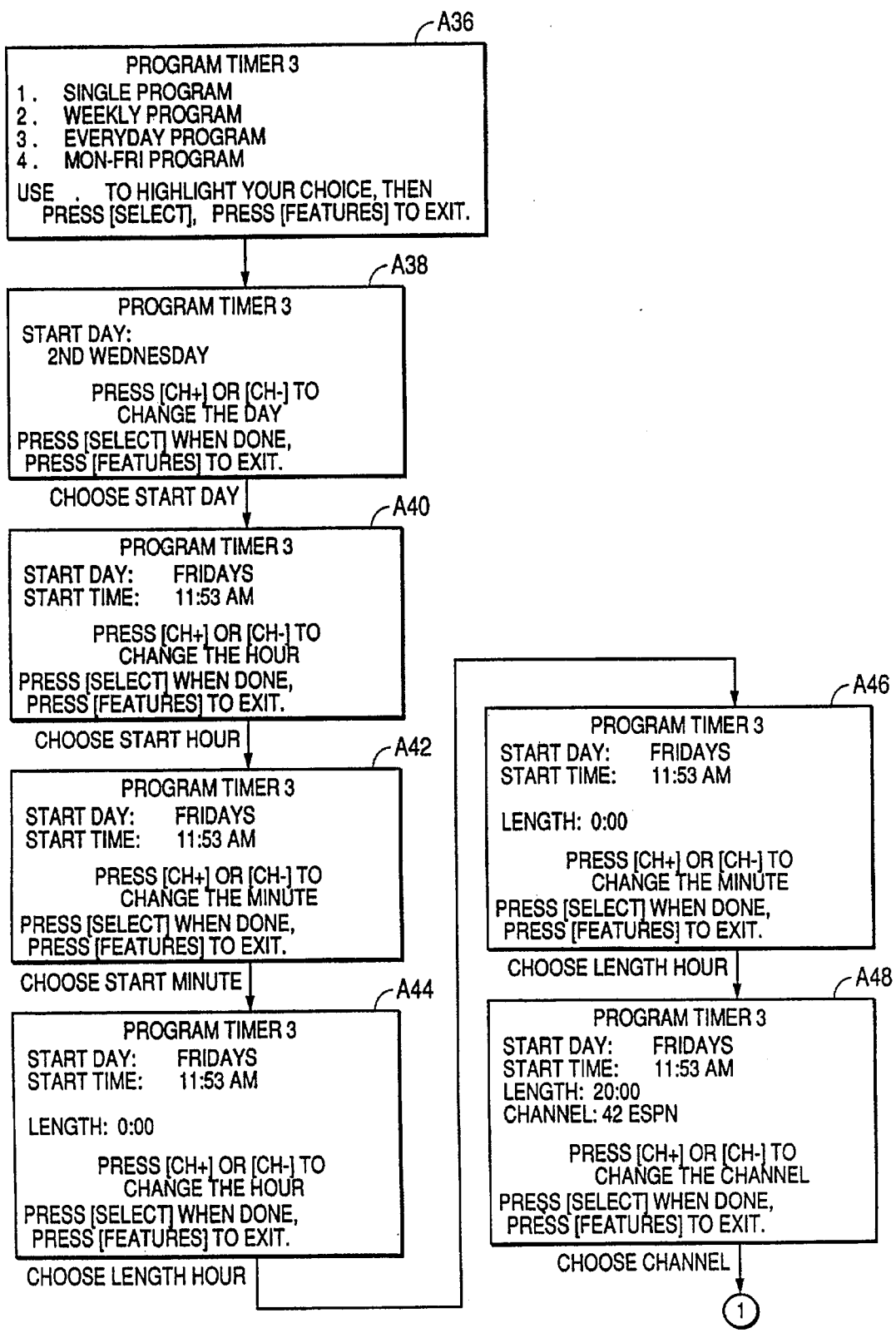
Figure 16C:
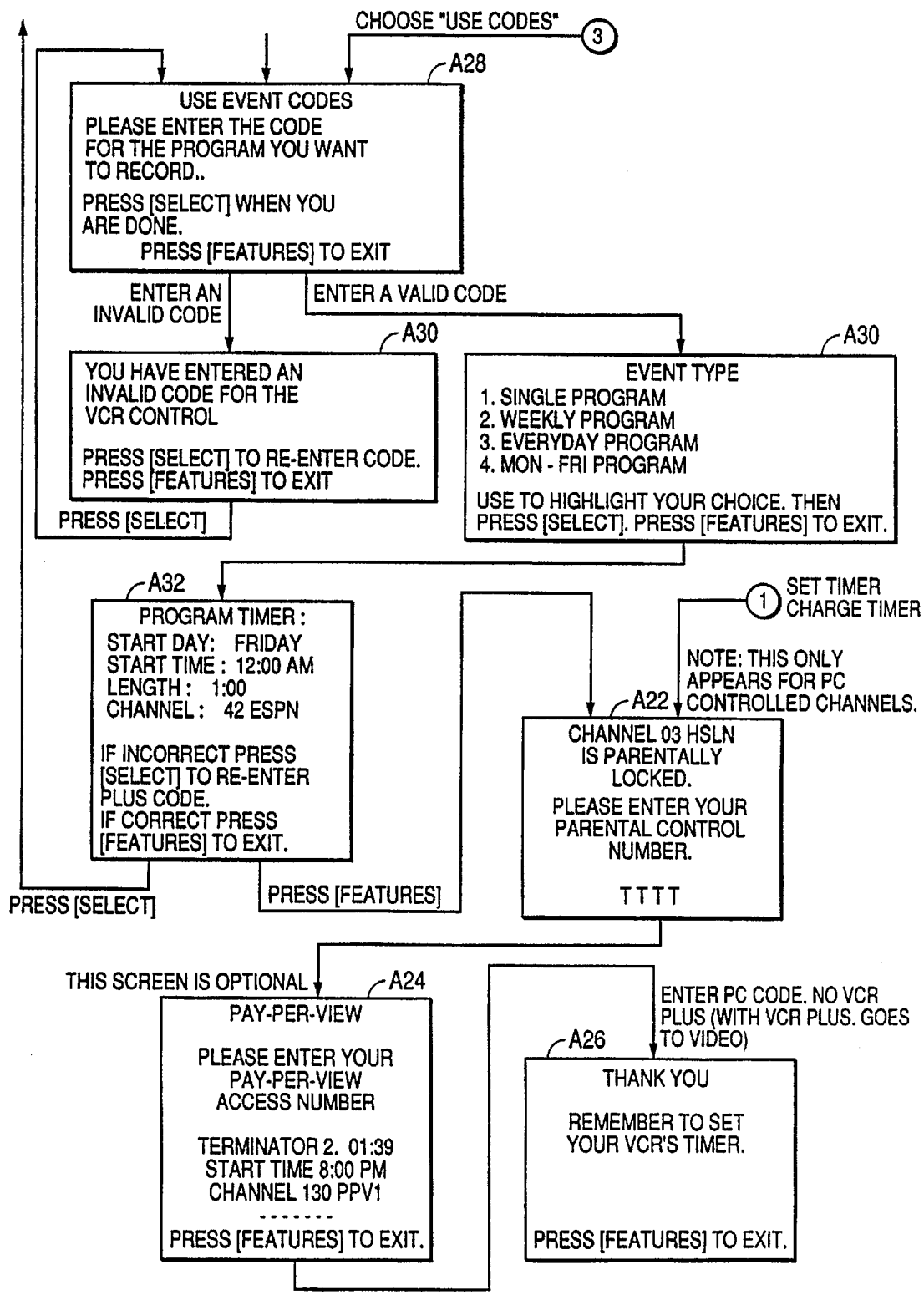

To review a timer, the menu item 4 is chosen and the on-screen display shown in block A14 is used to provide the subscriber with a detailed listing of the programs which have been programmed into timers. After review of these programs, the subscriber may exit the menu by pressing the features key 212. Alternatively, in block A16, if the subscriber has chosen to set a timer, a similar display of those programs already programmed in timers is provided. For setting a timer, the subscriber chooses a blank menu item which then can be run through a selection process in block A18 (FIG. 16B). Similarly, if a timer is to be changed, block A16 allows the subscriber to select which timer to change, and then continue the process of setting that timer in block A18. In block A18, more fully expanded as FIG. 16B, a number of on-screen displays assist the subscriber in selecting whether he would like to record a single program, record a program which is broadcast weekly, an everyday program, or a Monday through Friday program (Block A36). Further on screen displays allow selection of the start day (Block A38), start hour, start minutes (Block 42), length in hours (Block A44), and length in minutes (Block A46), and channel (Block A48).

After a new timer has either been set or changed, the subscriber terminal 40 will check to determine if the program the subscriber has selected is on a parentally locked channel. If it is, then the on-screen display in block A22 appears and the subscriber must enter his parental control number. Further, if the event is a pay-per-view event, then the subscriber is requested to enter his pay-per-view access number. The access number entry is optional with the service provider. The pay-per-view on screen display in block A24 indicates which program he has selected and the price for that program event. Further, the subscriber is reminded of the start time and the channel number of the program event for which he has set a timer. Finally, a reminder screen in block A26 is displayed to remind the subscriber to set his VCR timer if the IR peripheral controller 300 is not available.

Alternatively, according to the invention, when the subscriber wishes to use program event codes, he will select the first menu choice in block A12. This menu choice will cause the subscriber terminal 40 to display the screen in block A28, which requests the entry of the program event code. The subscriber will enter the program event code from the numeric keys of the remote control 126 and then press the select key 214 when finished. The subscriber terminal 40 will then generate the program event code transaction to check and translate the program event code. If an invalid code is detected in the reply transaction from the IR controller 300, the screen in block A30 is displayed to the subscriber. The screen in block A30 indicates that the subscriber has entered an invalid program code and can either attempt to reenter the code, by pressing the select key 244, or exit by pressing the features key 212. When the subscriber has entered a valid code and it has been translated, the screen in block A32 is displayed to indicate which program timer the subscriber terminal will use to time the event. The information returned by the IR peripheral controller 300 is then programmed into the program timer used. Information needed to confirm that the program event code was the one associated with the program event which the subscriber wishes to record is additionally displayed. The information includes the start day and time, the length of the program, and the channel which is to be tuned.

The on screen display in block A32 prompts the subscriber to either press the select key 214 if the program information is incorrect, or to press the features key, 212, if the program information is correct. If the information is incorrect, then the subscriber may enter another code by looping back to block A28 and proceed as previously described for entering and translating the code. If the program event code is correct, then a press of the features key 212 will transfer the terminal down to block A22 where the subscriber terminal determines whether the channel to which it is to be tuned is parentally locked. The process continues as previously described for blocks A24 and A26.

When one of the program timers elapses and indicates that a program event should be recorded, the subscriber terminal 40 uses the VCR control transaction to turn the VCR 350 on and off at the right times and to time the correct channel for the output from the subscriber terminal. In addition, the correct channel of the cable system is simultaneously tuned by the subscriber terminal 40. Therefore, an advantageous method of automatically recording a program event using an apparatus including the subscriber terminal 40, the VCR 350, the television receiver 352, and the IR controller 300 has been disclosed and described. The subscriber terminal 40 allows a single on-screen display which permits the use of one user interface for the subscriber and, at most, the setting of one program timer. The program timer is easily used with prompts through on-screen displays which in a step by step manner lead the subscriber through the process. Alternatively, an on screen assisted process for entering a program event code can be used to automatically program the timers and initiate the process from the simple entry of a number of digits which are associated with the program event.

Figure 16D:
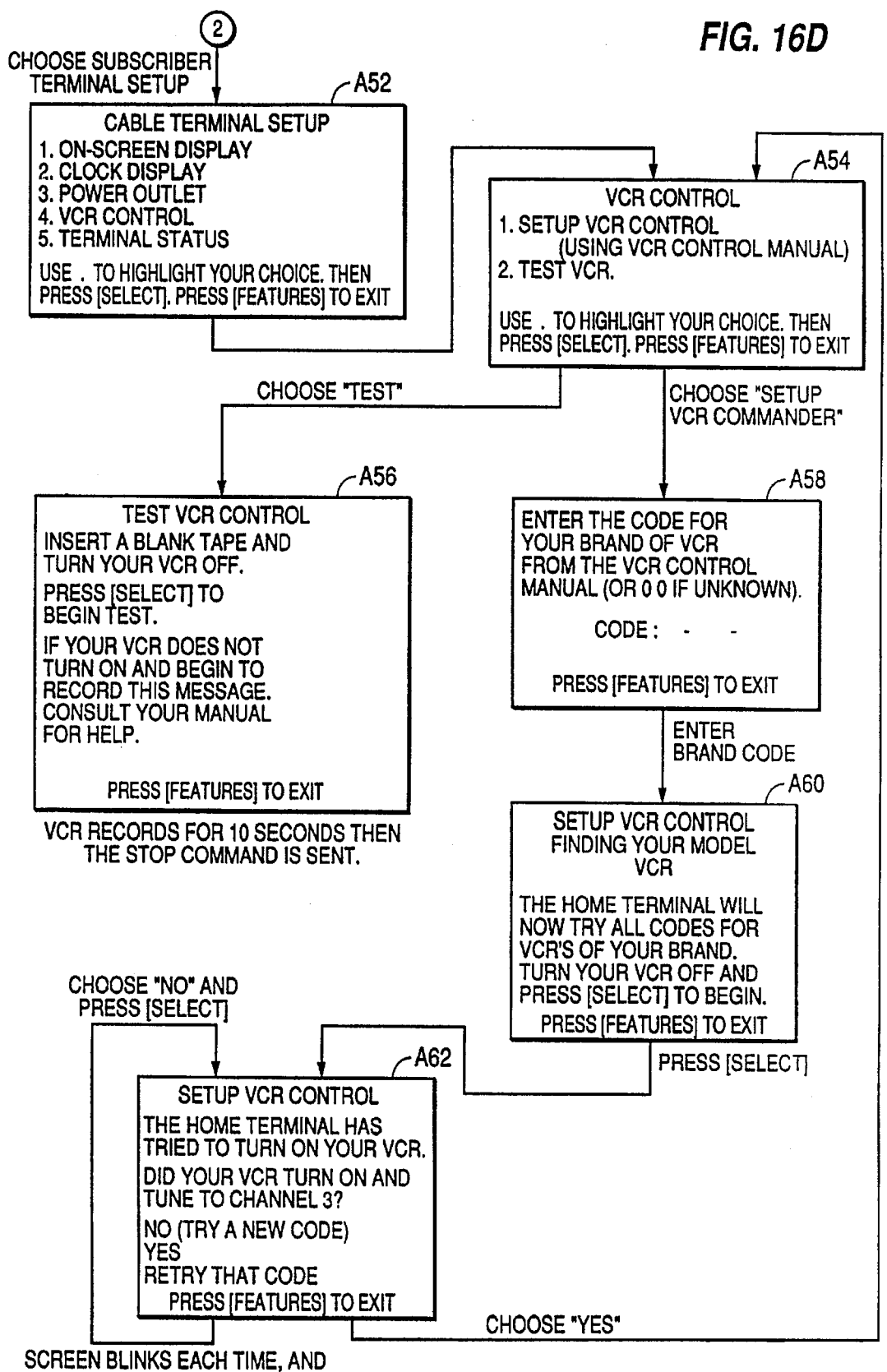
FIG. 16D is a system flow chart of the on screen operations of the subscriber terminal in the system illustrated in FIG. 7 utilizing the interface and transactions illustrated in FIGS. 10 and 11.

The on screen display operation to allow the subscriber terminal 40 to set up the IR peripheral control for a particular brand of VCR will now be more fully explained with reference to FIG. 16D. The set up operation for the subscriber terminal 40 is also entered through the features menu display in block A10 (FIG. 16A). One of the menu items on the features menu is to provide for the subscriber terminal set up. The choice of subscriber terminal set up causes the subscriber terminal 40 to display the screen shown in block A52 where VCR control may be selected.

The choice of VCR control causes the subscriber terminal to display the screen shown in block A54 where two menu choices are provided. The subscriber may either set up the VCR control or he may test the VCR control. If the subscriber chooses the test option, the program will choose a path to the on screen display illustrated in block A56. The subscriber is prompted to insert a blank recording tape in the VCR 350 and to turn the device off. After this is accomplished, he is instructed to press the select key 214 to begin the test. The select key 214 indicates that the test should begin and causes a VCR control transaction to tuna the VCR 350 on for a timed period of 10 seconds and then send a stop VCR command. The subscriber is prompted to determine whether the test has been successful by a message which indicates if the VCR did not turn on and record the message on the screen, then an error has occurred. The message further advises that the subscriber should consult a source of assistance, such as the VCR control manual.

If, on the other hand, the subscriber wants to begin the VCR configuration path, the program in block A54 will transfer control to block A58 where the subscriber is prompted to enter a 2 digit code representative of the VCR 350 that he possesses. If the subscriber does not know the code for his VCR, he then may enter 00 and the subscriber terminal 40 will hunt for the correct code. After the two digit number is entered, the subscriber terminal will display the next screen in block A60. The subscriber terminal 40 will also send the set up VCR transaction to the IR controller 300 to transfer the brand code identified by the subscriber. If the subscriber has entered the digits 00, then the transaction will command the IR peripheral controller 300 walk through each brand and model, beginning with the first brand and model.

The subscriber is then prompted to turn his VCR off and to press the select key 214 to begin the set up procedure. Next, in block A62, an on screen display indicates to the subscriber that the subscriber 40 terminal has tried to turn on the VCR 350 with the IRE codes associated with the brand and model. It then asks whether or not the VCR did indeed mm on and tune to the correct channel. If the subscriber answers negatively, by highlighting and selecting no, a set up VCR transaction commanding the IR peripheral controller 300 will be transmitted to try the next model code in the list and then returns to ask the same question. If, when the correct model for the brand is found, the selection of yes by the subscriber will bring the program back to the VCR control screen in block A54 where he may exit. In this manner an automatic set up for any brand of VCR may be accomplished easily and with the assistance of an on screen display.

While there has been shown and described the preferred embodiments of the inventions, it will be evident to those skilled in the art that various modifications may be made thereto without departing from the spirit and scope of the invention as set forth in the appended claim.

What is claimed is:

1. An auxiliary device interface for a subscriber terminal of a subscription television service which allows communication to or from, or control of or by, at least one auxiliary device; said auxiliary device controlling a recording apparatus selected from a plurality of brands or makes, each of said plurality of brands or makes responding to commands associated with said brands or makes, said auxiliary device interface comprising:

a transmitter included in the subscriber terminal for transmitting at least one of data, control, and instruction over a transmit conductor in a predetermined communication protocol to said at least one auxiliary device, said at least one of data control, and instruction including a generic start command or a generic stop command;

a receiver included in said subscriber terminal for receiving at least one of data, control, or instruction over a receive conductor in said communication protocol from said at least one auxiliary device;

an interface bus including at least said transmit conductor, said receive conductor, and a ground conductor, said interface bus connected between said subscriber terminal and each of said at least one auxiliary device;

a receiver included in each of said at least one auxiliary device for receiving transactions sent from the subscriber terminal over said transmit conductor;

each of said at least one auxiliary device including processing means for processing the received data, control, or instruction; and, a transmitter included in each of said at least one auxiliary device for transmitting at least one of data, control or instruction in said communication protocol over the receiver conductor, wherein the transmitted at least one of data, control or instruction, transmitted from said transmitter in said at least one auxiliary device, is responsive to the received data, control, or instruction from the subscriber terminal and wherein said associated commands are generated in response to the receipt of said at least one of data, control or instruction from said subscriber terminal.

2. A system for automatically recording a program event broadcast over a subscription television system, said system comprising:

a subscriber terminal adapted to selectively tune the program event at a broadcast time;

a recording apparatus coupled to said subscriber terminal and adapted to record said selectively tuned program event, said recording apparatus selected from a plurality of brands or makes of recording apparatuses, each of said plurality of brands or makes responding to commands associated with said brands or makes; and, a peripheral controller, bi-directionally communicating with said subscriber terminal via a peripheral interface, said peripheral controller receiving generic commands from said subscriber terminal and outputting said associated commands to said subscriber terminal in response to receipt of said generic commands, said associated commands controlling said recording apparatus;

wherein at least one of said generic commands generated by said subscriber terminal includes a command to said peripheral controller to begin recording at the broadcast time the program event and at least another of said generic commands generated by said subscriber terminal includes a command to stop recording after the program event.

3. A system for automatically recording a program event as set forth in claim 2, wherein:

said recording device is a video cassette recorder.

4. A system for automatically recording a program event as set forth in claim 3, wherein:

said peripheral controller controls said video cassette recorder by means of an encoded infra-red transmission.

5. A system for automatically recording a program event as set forth in claim 2, wherein said subscriber terminal further includes:

a controller for setting a program timer which generates an event start signal as the broadcast time of said program event and generates an event stop signal at the end of said program event;

wherein said controller is responsive to said event start and stop signals, and causes said command to begin recording and said command to stop recording to be transmitted to said peripheral controller.

6. The auxiliary device interface for a subscriber terminal of a subscription television service according to claim 1, said at least one auxiliary device connected to and unidirectionally communicating with said recording apparatus.

7. The auxiliary device interface for a subscriber terminal of a subscription television service according to claim 6, said at least one auxiliary device transmitting information to said recording apparatus via an infrared transmission.

8. The system for automatically recording a program event broadcast over a subscription television system according to claim 2, said peripheral controller unidirectionally communicating to said recording apparatus.

* * * * *